US008625686B2

(12) United States Patent
Li et al.

(10) Patent No.: US 8,625,686 B2
(45) Date of Patent: Jan. 7, 2014

(54) WINDOW POSITION OPTIMIZATION FOR PILOT-AIDED OFDM SYSTEM

(75) Inventors: Yan Li, Newtown, PA (US); Feng Huang, Hoffman Estates, IL (US); Ravikiran Rajagopal, Yardley, PA (US); Troy Schaffer, Newtown, PA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1126 days.

(21) Appl. No.: 12/175,851

(22) Filed: Jul. 18, 2008

(65) Prior Publication Data

US 2010/0014600 A1    Jan. 21, 2010

(51) Int. Cl.
*H04K 1/10*    (2006.01)

(52) U.S. Cl.
USPC ........... 375/260; 370/343; 370/208; 370/252; 375/316

(58) Field of Classification Search
USPC .......... 370/208, 252; 375/260, 239, 340, 344, 375/346
See application file for complete search history.

(56) References Cited

U.S. PATENT DOCUMENTS

| | | | | |
|---|---|---|---|---|
| 5,844,946 | A * | 12/1998 | Nagayasu ..................... | 375/341 |
| 7,697,412 | B2 * | 4/2010 | Anderson et al. ............. | 370/208 |
| 2004/0141570 | A1 * | 7/2004 | Yamazaki et al. ............ | 375/340 |
| 2006/0153317 | A1 * | 7/2006 | Zhang et al. .................. | 375/344 |
| 2007/0002979 | A1 * | 1/2007 | Verdi ............................. | 375/346 |
| 2008/0123540 | A1 * | 5/2008 | Mantravadi et al. .......... | 370/252 |
| 2008/0198942 | A1 * | 8/2008 | Akella et al. ................. | 375/260 |
| 2008/0253279 | A1 * | 10/2008 | Ma et al. ...................... | 370/206 |
| 2009/0180558 | A1 * | 7/2009 | Ma et al. ....................... | 375/260 |
| 2010/0142612 | A1 * | 6/2010 | van Rooyen .................. | 375/239 |

OTHER PUBLICATIONS

Association of Radio Industries and Businesses, "Receiver for Digital Broadcasting", ARIB Standard (Desirable Specifications), ARIB STD-B21, Version 4.6, (Mar. 14, 2007).

European Telecommunication Standards Institute, "Digital Video Broadcasting (DVB); Framing Structure, Channel Coding and Modulation for Digital Terrestrial Television", ETSI EN 300 744, V1.5.1, (Nov. 2004).

* cited by examiner

*Primary Examiner* — Leon-Viet Nguyen

(74) *Attorney, Agent, or Firm* — Volpe and Koenig, P.C.

(57) ABSTRACT

A window position optimization for a pilot-aided OFDM system is disclosed. A method of reducing aliasing in an orthogonal frequency division multiplexing (OFDM) system, using window optimization and pilots comprises receiving an RF signal including a pilot, generating a channel frequency response estimate, interpolating the channel estimate to calculate a pilot carrier frequency response, and dynamically selecting a window to capture a channel impulse response to prevent aliasing.

12 Claims, 5 Drawing Sheets

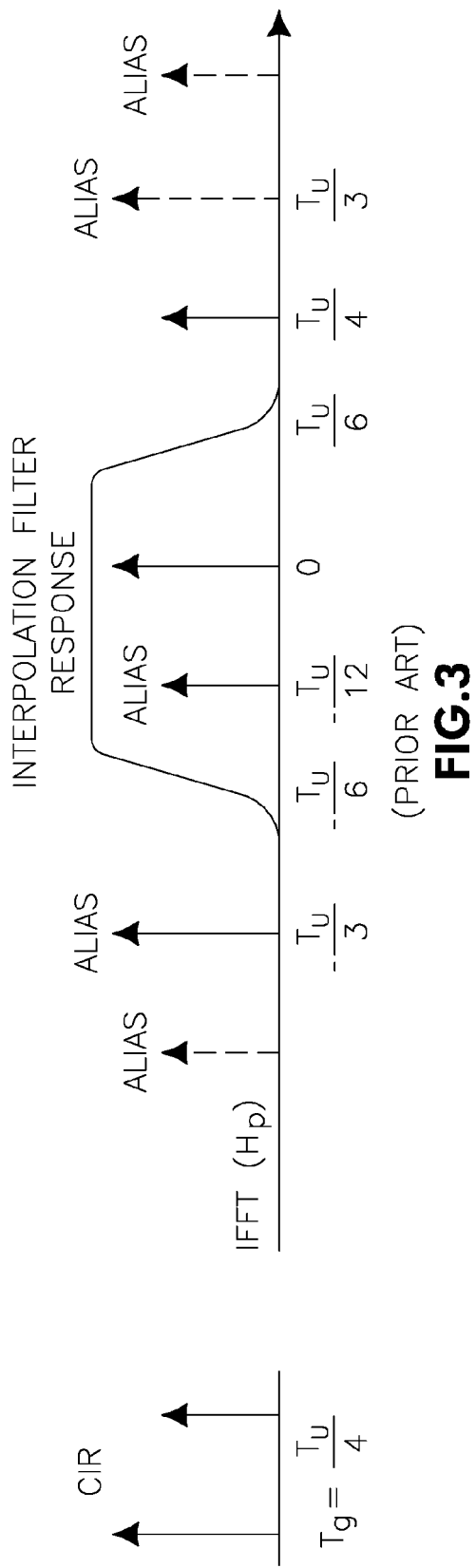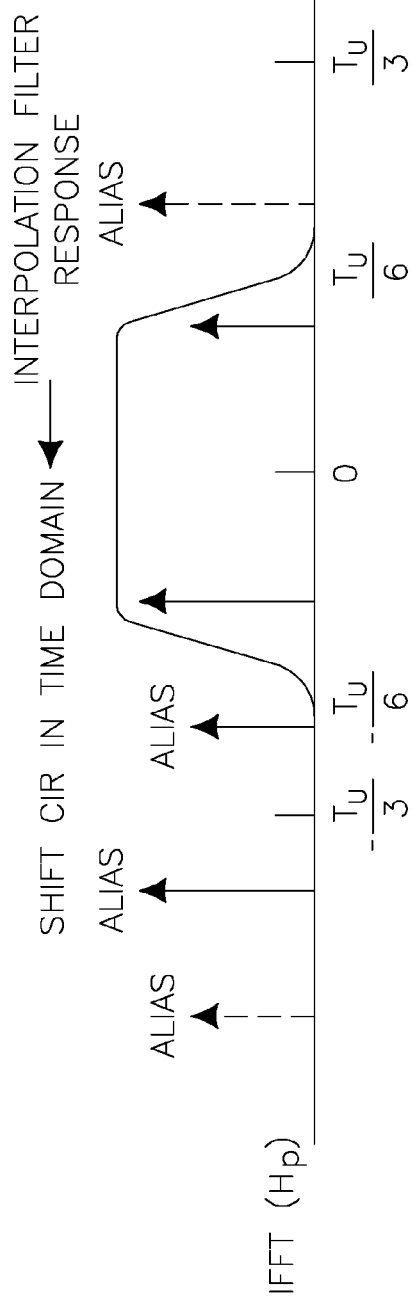

WINDOW POSITION OPTIMIZATION FOR PILOT-AIDED OFDM SYSTEM

FIELD OF INVENTION

This application is related to digital broadcasting systems.

BACKGROUND

A single-frequency network (SFN) is a broadcast network where multiple transmitters simultaneously transmit the same signal over the same frequency channel. Some examples of SFNs include Digital Video Broadcasting-Terrestrial (DVB-T) and Integrated Services Digital Broadcasting-Terrestrial (ISDB-T) systems. DVB-T is a coded orthogonal frequency division multiplexing modulation (COFDM) system. In a DVB-T system, a number of time-shifted versions of the same transmitted signal are received by the DVB-T receiver. The distribution of path delays between the signals is known as the delay spread of the channel. The delay spread causes the transfer function of the channel to vary over frequency which results in inter-symbol interference (ISI) and frequency selective fading.

In a DVB-T or ISDB-T system, a cyclic prefix is inserted as a guard interval (with a length of ¼, ⅛, ¹⁄₁₆, or ¹⁄₃₂ of one symbol) to combat the ISI caused by channel delay spread. An ISI-free transmission may be guaranteed when the channel length is shorter than the guard interval. Increasing the length of the guard interval, however, may reduce the channel efficiency.

Pilots are also transmitted, on selected carriers, to equalize the received signal, estimate the channel response, determine the signal to noise ratio (SNR), and to assist in timing and synchronization. There are two types of pilots that are commonly used in an SFN; continuous pilots and scatter pilots. Continuous pilots are transmitted in every symbol whereas scattered pilots are repeated periodically, such as every four symbols. The pilot carriers are identified by carrier indexes. An example pilot structure of a DVB-T system is shown in FIG. 1. Pilots are transmitted using binary phase-shift keying (BPSK). The pilot carriers have a boosted power level of 16/9, compared to QPSK/16 QAM/64 QAM with power level of 1/1 for data carriers. The power boost assures that the channel response of the pilot carriers ($H_P$) can be reliably estimated.

FIG. 1 shows an example pilot structure of an OFDM DVB-T system. The bit stream is split into parallel data streams, each transferred over its own carrier using BPSK. The modulated carriers may be summed to form an OFDM signal. A bitstream is transferred over a communication channel using a sequence of OFDM symbols. As shown in FIG. 1, in one symbol, there is one pilot inserted every twelve carriers. The scattered pilot pattern repeats every four symbols. Combining the pilots from four symbols gives one pilot every three carriers. A channel estimate ($\hat{H}_P$) that is generated based on the pilots of a scattered pilot pattern is a downsampled-by-three version of the overall channel frequency response H.

In DVB-T, the continuous pilots are a sub-set of scattered pilots. Both continuous/scattered pilots only use a portion of all the carriers in one symbol. The channel response on these pilot carriers is first estimated. The channel response may be estimated for the data carriers based on any known algorithm, including least square (LS), minimum mean-square error (MMSE) or Modified MMSE. The estimation can be performed once per symbol.

FIG. 2 is a flow diagram of a method (200) to estimate the channel frequency response of an OFDM system. A handset receives the pilots over pilot carriers with boosted power levels 205. The handset then determines the channel response $H_P$ of the data carriers that are transmitted in between the transmission of the pilot carriers 210. The channel response $H_P$ may be determined using interpolation based on the channel estimate $\hat{H}_P$. Next, the handset performs an inverse fast Fourier transform (IFFT) on the channel estimate $\hat{H}_P$, to generate a resolution-reduced channel impulse response (CIR) $\hat{h}$ (215). The resolution-reduced CIR $\hat{h}$ is used to adjust the symbol timing, which refers to the point where individual OFDM symbols start and end (220). A fast Fourier process is performed, wherein the adjusted symbol timing is used to define the fast Fourier transform window (225). This method, however, may result in aliasing. Because the channel estimate $\hat{H}_P$ is the downsampled-by-three version of the channel frequency response H, the resolution-reduced CIR $\hat{h}$ will be repeated at $T_u/3$ interval, where $T_u$ is the time span of one OFDM symbol. Therefore, any channel longer than $T_u/6$ will cause aliasing, as shown in FIG. 3.

FIG. 3 is a graph showing an aliasing problem associated with a long channel. Instead of a post-cursive channel with length of $T_u/4$, the resolution-reduced CIR $\hat{h}$ becomes a pre-cursive channel with length of $T_u/12$ because of the use of the window $[-T_u/6, T_u/6]$, which can result in aliasing. Aliasing can affect both the symbol timing and channel estimation, which thereby causes a demodulator malfunction.

The aliasing problem can be partially resolved by designing a system that weighs the post-cursive channel more heavily. However, this design only improves the aliasing problem in a channel with a constrained channel length and without any outside guard echoes. Current solutions focus on generating a channel estimate based only on the continuous/scattered pilot signal. However, if the channel impulse response is too long, the continuous/scattered pilots are not transmitted frequently enough to recover all the channel information.

SUMMARY

A method and apparatus for window position optimization in a pilot-aided OFDM system is disclosed. A method of reducing aliasing in an OFDM system, using window optimization and pilots comprises receiving an RF signal including a pilot, generating a channel frequency response estimate, interpolating the channel estimate to calculate a pilot carrier frequency response, and dynamically selecting a window to capture a channel impulse response to prevent aliasing.

BRIEF DESCRIPTION OF THE DRAWINGS

A more detailed understanding may be had from the following description, given by way of example in conjunction with the accompanying drawings wherein:

FIG. 3 is a graph showing an aliasing problem associated with a long channel;

FIG. 5 is a graph showing a shifted channel impulse response to reduce aliasing.

DETAILED DESCRIPTION

In the DVB-T/ISDB-T systems, continuous/scattered pilots are transmitted for the use in synchronization, channel estimation, etc. In addition to the continuous and scattered pilot carriers, DVB-T systems may also include transmission parameter signaling (TPS) carriers. TPS carriers are transmitted in parallel with the continuous/scattered pilot carriers; however they are transmitted more frequently (seventeen carriers for 2K mode and sixty-eight carriers for 8K mode). TPS carriers convey information regarding: a) modulation including the value of the QAM constellation pattern; b) hierarchy information; c) guard interval (not for initial acquisition but for supporting initial response of the receiver in case of reconfiguration); d) inner code rates; e) transmission mode; and f) frame number in a super-frame. Methods and apparatus using the TPS carrier to assist in acquiring channel information, particularly the optimal window that contains the correct channel impulse response, are disclosed.

Figure 4:
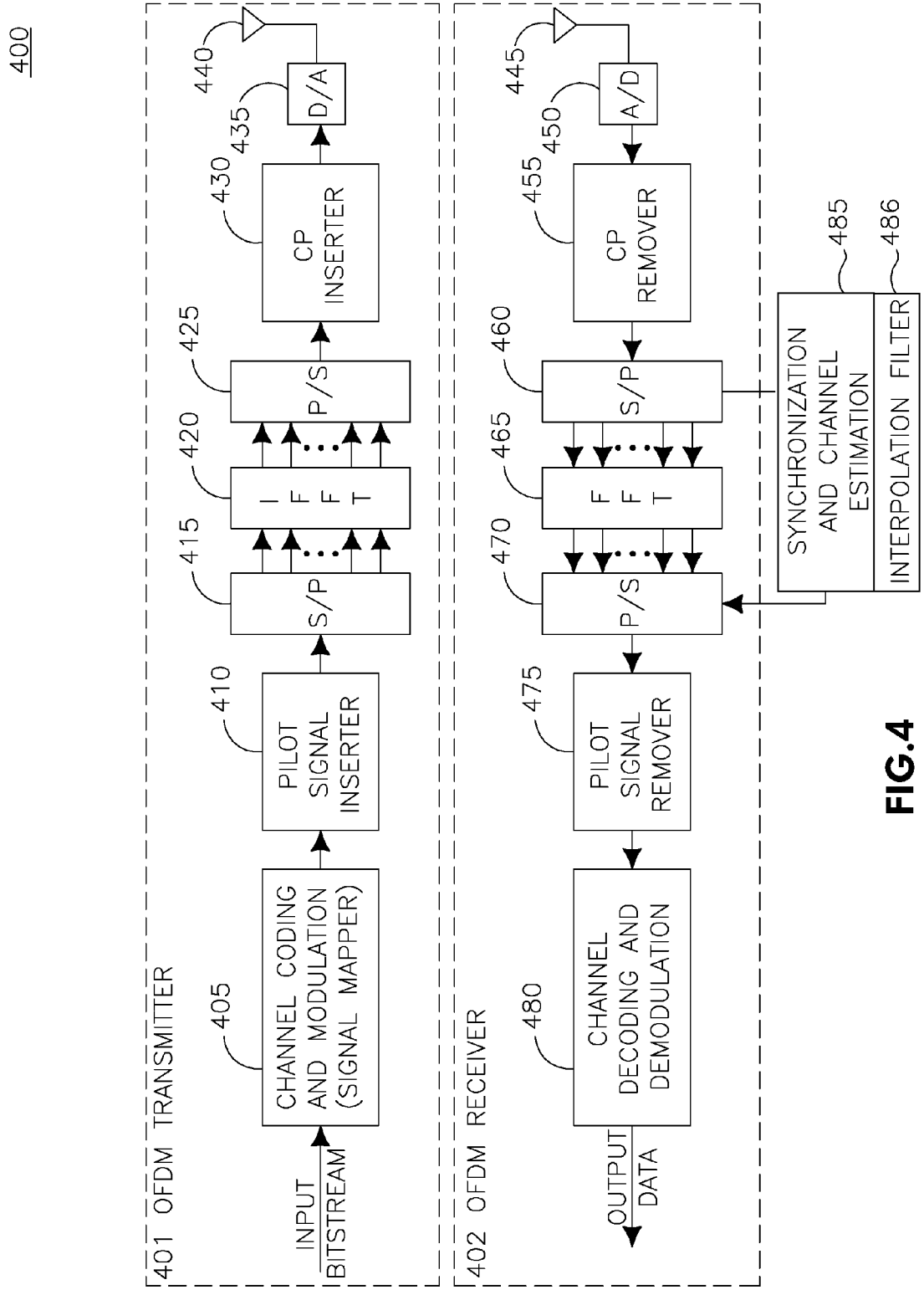
FIG. 4 is a baseband equivalent OFDM system.

A baseband equivalent OFDM system 400 is shown in FIG. 4, including an OFDM transmitter 401 and an OFDM receiver 402. The OFDM transmitter 401 includes a channel coding and modulation block 405, pilot signal inserter block 410, a serial-to-parallel (S/P) converter 415, an inverse fast Fourier transform (IFFT) block 420, a parallel-to-serial (P/S) converter 425, a cyclic prefix (CP) inserter 430, a digital-to-analog converter 435, and a transmitter antenna 440. The OFDM receiver 402 includes a receiver antenna 445, an analog-to-digital converter 450, a CP remover 455, an S/P converter 460, a fast Fourier transform (FFT) block 465, a P/S shifter 470, a pilot symbol extractor 475, a channel decoding and demodulation block 480, and a synchronization and channel estimation (SCE) block 485.

Referring to the OFDM transmitter 401 of FIG. 4, an input bitstream is received by a channel coding and modulation block 405 which performs channel coding and modulation (e.g., quadrature phase shift keying (QPSK), 8-ary PSK (8 PSK), 16-ary quadrature amplitude modulation (16 QAM, 64 QAM, 256 QAM, etc.) on the input bitstream and outputs a modulated signal.

The pilot signal inserter 410 is configured to insert the continuous pilot signaling, the scattered pilot signaling, as well as the TPS signaling into the modulated signal. The S/P converter 415 converts the modulated signal into a parallel signal. The parallel signal is received by the IFFT block 420, which performs IFFT processing and converts the composite signal into a time domain signal. The time domain signal is converted into a serial digital signal by P/S converter 425.

The CP inserter 430 inserts a CP into the time domain signal, which is used for dealing with multi-path distortion. The signal is then passed through the digital-to-analog converter 435 which converts it to a radio frequency (RF) analog signal. The RF analog signal is then transmitted by the transmitter antenna 440.

Figure 1:
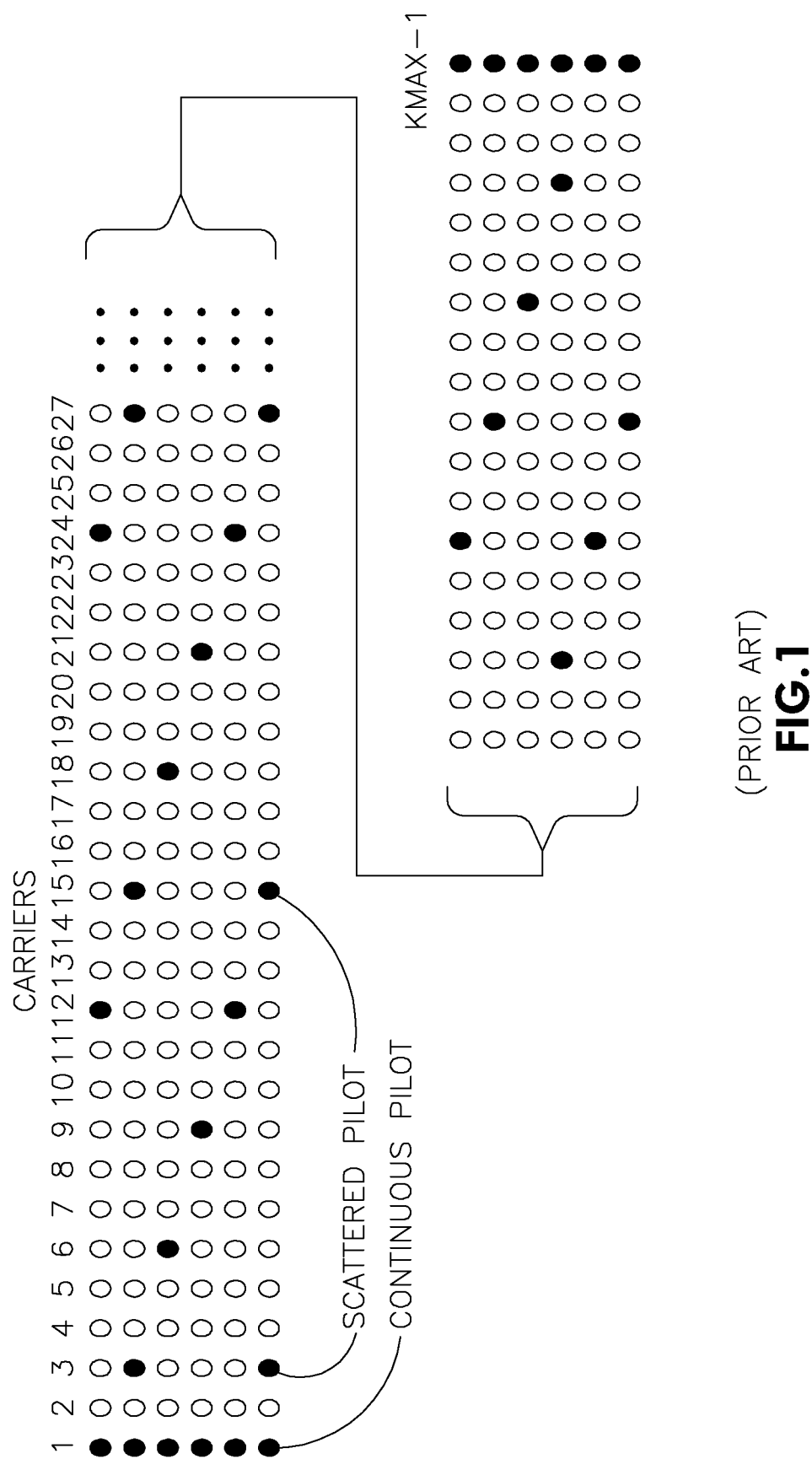
FIG. 1 shows an example pilot structure of a DVB-T system.
Figure 2:
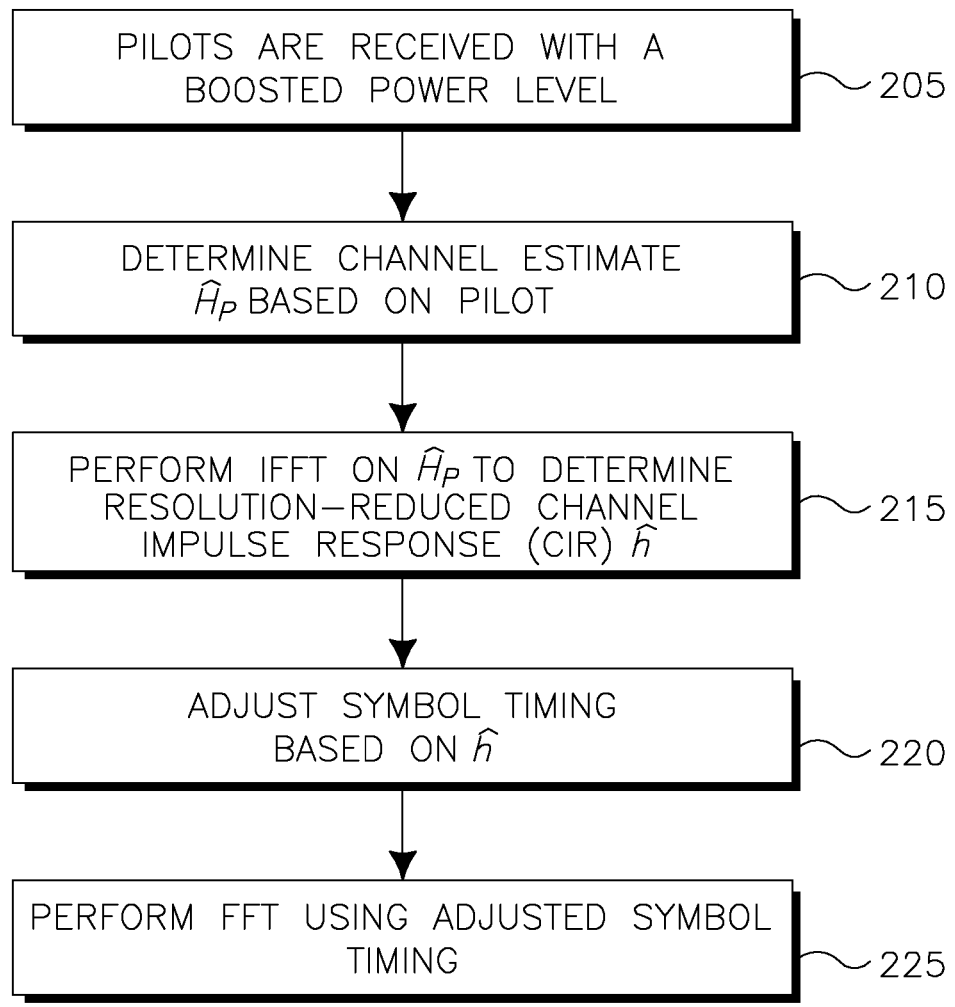
FIG. 2 is a flow diagram of a method to estimate the channel frequency response of an OFDM system.

Referring to the OFDM receiver 402 of FIG. 2, the receiver antenna 445 receives the RF analog signal. The analog-to-digital converter 450 converts it to a digital signal. The CP remover 455 receives the digital signal and removes the CP. The S/P converter 460 converts the digital signal into a parallel signal. The output of the S/P converter 460 is also received by the SCE block 485.

The SCE block 485 is configured to estimate the noise power based on inserted continuous/scattered pilot signals, TPS signals and other equivalent signals, (e.g. TMCC), as will be explained in further detail hereinafter. The SCE block 485 then outputs channel estimates, as will be discussed further below. The SCE block 485 can be configured to operate using any known approach of channel estimation, including but not limited to: Least-squares (LS) or Linear Minimum Mean Squared Error (LMMSE) methods. For example, the SCE block 485 may be configured to generate LS estimates of the channel gains over the continuous pilot carriers by back-rotating the received signal according to the knowledge of the continuous pilot symbols. The SCE block 485 may also include an interpolation filter 486 configured to smooth over (interpolate) the LS estimates over the entire frequency-time grid.

In one embodiment, to resolve the aliasing problem that is often associated with long channels, the SCE block 485 is configured for dynamic channel selection of the window to capture the CIR. In order to perform the dynamic channel selection, after receiving a parallel signal from the S/P converter 460, the SCE block 485 isolates the TPS carriers. The TPS carriers are then processed by the SCE block to determine a first channel estimate based on the TPS carriers. Because of the frequency of transmission of the TPS carriers, the channel response can be estimated accurately on the TPS carriers. These properties of the TPS signaling allow the SCE Block 48 to determine the first channel estimate in the same manner as a channel estimate for a continuous pilot carrier would be determined, (using e.g. LS, LMMSE, etc.) Since the TPS carrier and continuous pilot carriers comprise known data, the simplest method to estimate the channel frequency response is to divide the received data on those carriers by the known data.

The SCE block 485 would generate a second channel estimate based on the continuous/scattered pilots. This estimate can be generated based on any of the methods discussed above or any method known in the art.

Once the first and second channel estimates have been determined, the SCE block 485 then compares the first channel estimate and the second channel estimate. Based on the comparison, the SCE block 485 selects a window that minimizes the differences between the two channel estimates for the interpolation filter 486. However, for different windows, the estimation based on pilots will be different. Accordingly, the SCE block 485 may select multiple different windows and repeat the process described above for several windows. The SCE block 485 may also store the values of the comparisons resulting from the multiple window selections. The SCE block 485 may then select the window that minimizes the difference in channel estimates. Alternatively, the SCE block 485 may be configured with an algorithm to assist in the window selection to minimize the steps involved in the iterative process. Once a preferred window is selected, the SCE block 485 may capture a channel impulse response. For example, referring to FIG. 3, if the interpolation filter 486 uses the window $[-T_u/6, T_u/6]$, then aliasing occurs. However, if the window between $[0, T_u/3]$ is used, there will be no aliasing.

FIG. 5 is a graph where the channel impulse response is shifted to reduce aliasing. In some systems, the interpolation filter 486 may be configured to always use the window centered at zero. After determining the channel estimates, the SCE block 485 may apply a phase slope across all of the pilot carriers, which will shift the correct CIR into the window. Accordingly, referring to the example above, the time interval $[-T_u/6, T_u/6]$ becomes the correct window by shifting the correct CIR into the window $[-T_u/6, T_u/6]$. Selecting the proper window may guarantee proper equalization for channels shorter than $T_u/3$. With the interpolation filter 486, as long as the channel length is less than $T_u/3$, by trying different shifting of CIR, the SCE block 485 is able to find the shifting direction and the amount of shifting to make minimize the difference in the channel estimates $\hat{H}_{TPS}$ and $\tilde{H}_{TPS}$, which is equivalent to finding the correct window to capture the correct CIR.

The FFT block 465 receives the output signal of the S/P converter 460 and performs FFT processing on it. FFT processing is well known in the art and can be performed according to any known method. A time domain signal is output from the FFT block 465.

When the channel estimate is available from the SCE block 485, the output of the FFT block 465 is signaled to the P/S shifter 470. The P/S shifter 470 compensates any channel effects and improves the bit error rate (BER) performance and converts the received time domain signal into a serial signal.

The pilot signal remover 475 receives the output of the P/S shifter 470 and extracts the pilot signal. The pilot signal remover 475 output then passes to the channel decoding and demodulation block 480 which decodes and demodulates the signal to a display.

Figure 6:
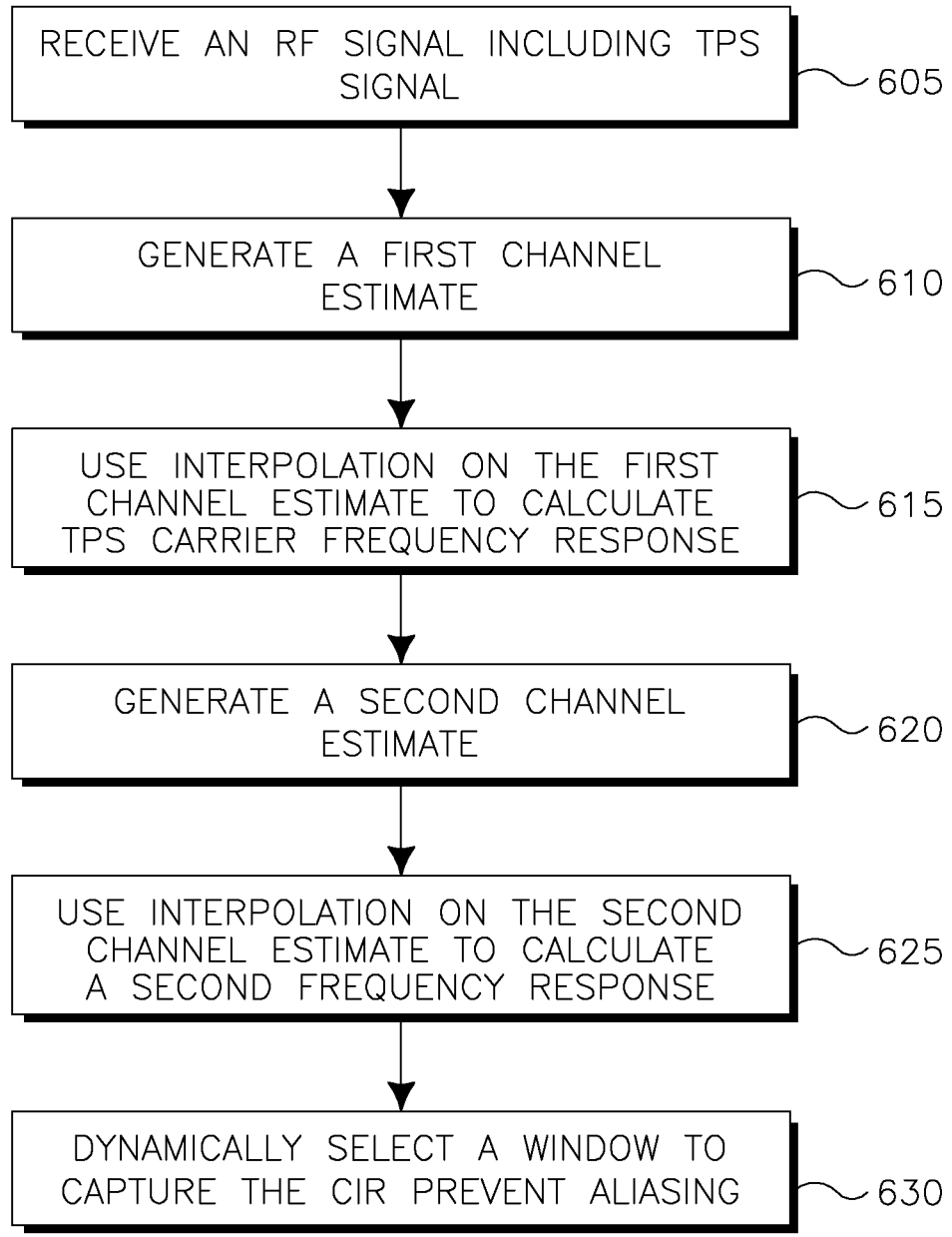
FIG. 6 is a flow diagram of a method of window position optimization for a pilot-aided OFDM system.

FIG. 6 is a flow diagram of a method 600 of window position optimization for a pilot-aided OFDM system. The OFDM receiver receives an RF analog signal including a TPS signal (605). A first channel estimate of a TPS carrier is generated (610). Interpolation is used on the first channel estimate to calculate a TPS carrier channel frequency response (615). A second channel frequency response is estimated based on the continuous/scattered pilot signals (620). Interpolation is used on the second channel estimate to calculate a continuous/scattered pilot carrier channel frequency response (625). A window is then dynamically selected to minimize the difference of the two estimates (630). When there is no aliasing, $\hat{H}_{TPS}$ and $\tilde{H}_{TPS}$ will be almost identical, subject to minor difference because of noise. However, if aliasing occurs, then $\hat{H}_{TPS}$ and $\tilde{H}_{TPS}$ will be different because they represent different channels. As mentioned herein before, selection of the proper window to capture the CIR can prevent aliasing.

While the examples above are shown for use in a DVB-T system, they may also be used in other broadcasting networks. Examples of broadcasting networks includes second generation Digital Video Broadcasting-Terrestrial (DVB-T2), Digital Video Broadcasting-Terrestrial/Handheld (DVB-T/H), ISDB-T, Digital Audio Broadcasting (DAB), Digital Multimedia Broadcasting (DMB, and Media-Flo.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

What is claimed is:

1. A method of reducing aliasing in an orthogonal frequency division multiplexing (OFDM) system, the method comprising:

receiving a signal including a transmission parameter signaling (TPS) signal;

determining a first channel estimate based on the TPS signal;

receiving a continuous pilot signal;

determining a second channel estimate based on the continuous pilot signal;

selecting a first window in which to capture a channel impulse response, wherein the window minimizes a difference between the first channel estimate and the second channel estimate;

determining a channel impulse response based on the first window; wherein the selecting is performed to capture the channel impulse response to prevent aliasing;

selecting a second window in which to capture a channel impulse response;

determining a second channel impulse response based on the selected second window;

selecting between the first and second windows as a preferred window; and determining a channel impulse response based on the preferred window.

2. The method of claim 1, further comprising:

shifting the channel impulse response into the selected window.

3. The method of claim 1, wherein the OFDM system is a digital video broadcasting-terrestrial (DVB-T) system.

4. The method of claim 1, wherein the OFDM system is a integrated services digital broadcasting-terrestrial (ISDB-T) system.

5. The method of claim 1, wherein the first pilot signal is a transmission and multiplexing configuration control (TMCC) signal.

6. An orthogonal frequency division multiplexing (OFDM) receiver, the OFDM receiver comprising:

receiving a signal including a transmission parameter signaling (TPS) signal;

determining a first channel estimate based on the TPS signal;

receiving a continuous pilot signal;

determining a second channel estimate based on the continuous pilot signal;

a synchronization and channel estimation (SCE) block configured to receive a signal including a transmission parameter signaling (TPS) signal and to determine a first channel estimate based on the TPS signal, to receive a continuous pilot signal and to determine a second channel estimate based on the continuous pilot signal;

the SCE block further configured to select a first window in which to capture a channel impulse response, wherein the window minimizes the difference between the first channel estimate and the second channel estimate, wherein the SCE block is further configured to determine a channel impulse response based on the first selected window, and wherein the selecting is performed to capture the channel impulse response to prevent aliasing;

the SCE block is further configured to select a second window in which to capture a channel impulse response; and the SCE block further configured to determine a second channel impulse response based on the second selected window and to select between the first and second windows as a preferred window and then determine a channel impulse response based on the preferred window.

7. The OFDM receiver of claim 6, wherein the SCE block is further configured to shift the channel impulse response into the selected window.

8. The OFDM receiver of claim 6, wherein the OFDM system is a digital video broadcasting-terrestrial (DVB-T) system.

9. The OFDM receiver of claim 6, wherein the OFDM system is a integrated services digital broadcasting-terrestrial (ISDB-T) system.

10. The OFDM receiver of claim 6, wherein the first pilot signal is a transmission and multiplexing configuration control (TMCC) signal.

11. A machine readable storage medium having a stored set of instructions executable by a machine, the instructions when executed are adapted to perform operations comprising:

receiving a signal including a transmission parameter signaling (TPS) signal;
determining a first channel estimate based on the TPS signal;
receiving a continuous pilot signal;
determining a second channel estimate based on the continuous pilot signal;
selecting a first window in which to capture a channel impulse response, wherein the window minimizes a difference between the first channel estimate and the second channel estimate;
determining a channel impulse response based on the first window; wherein the selecting is performed to capture the channel impulse response to prevent aliasing;
selecting a second window in which to capture a channel impulse response;
determining a second channel impulse response based on the selected second window;
selecting between the first and second windows as a preferred window; and
determining a channel impulse response based on the preferred window.

12. A computer-readable medium containing a first set of instructions adapted to create a processor, wherein the processor is configured to implement a second set of instructions, the second set of instructions comprising:

instructions to receive a signal including a transmission parameter signaling (TPS) signal, to determine a first channel estimate based on the TPS signal, to receive a continuous pilot signal and to determine a second channel estimate based on the continuous pilot signal;
the computer-readable medium further comprising instructions to select a first window in which to capture a channel impulse response, wherein the window minimizes the difference between the first channel estimate and the second channel estimate;
the computer-readable medium further comprising instructions to determine a channel impulse response based on the first window; wherein the selecting is performed to capture the channel impulse response to prevent aliasing;
the computer-readable medium further comprising instructions to select a second window in which to capture a channel impulse response; and
the computer-readable medium further comprising instructions to determine a second channel impulse response based on the second selected window and to select between the first and second windows as a preferred window and then determine a channel impulse response based on the preferred window.

\* \* \* \* \*